UNITED STATES PATENT OFFICE.

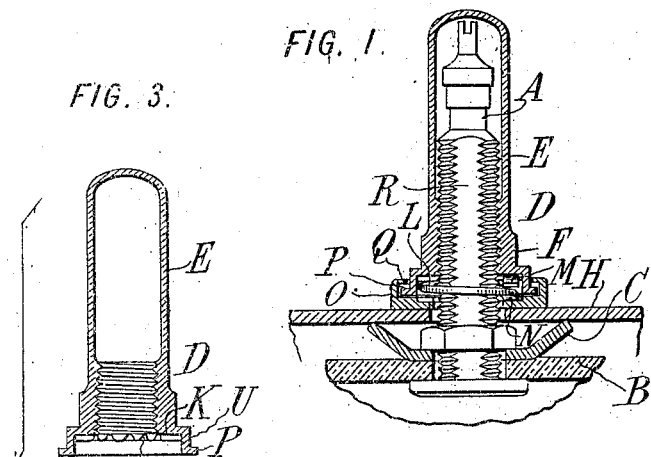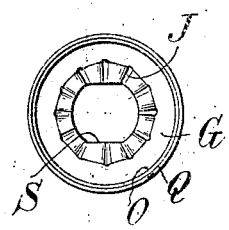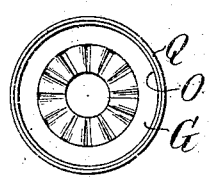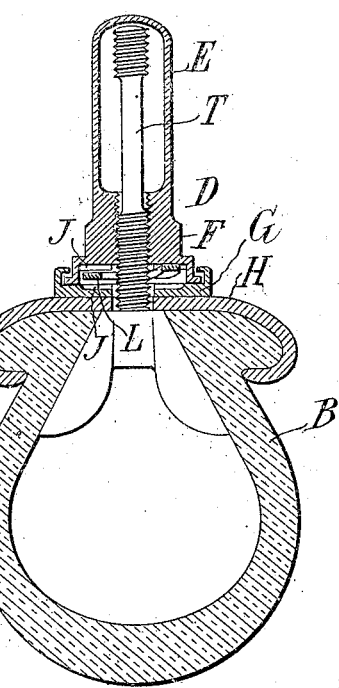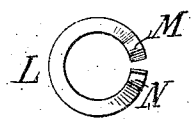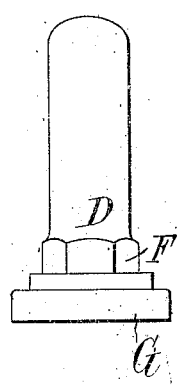

HARRY K. RAYMOND, OF AKRON, OHIO.

CAP FOR TIRE-VALVES, STAY-BOLTS, OR THE LIKE.

1,115,864.

Specification of Letters Patent. Patented Nov. 3, 1914.

Application filed January 22, 1907. Serial No. 353,572.

*To all whom it may concern:*

Be it known that I, HARRY K. RAYMOND, a citizen of the United States, residing at Akron, in the county of Summit and State of Ohio, have invented certain new and useful Improvements in Caps for Tire-Valves, Stay-Bolts, or the like, of which the following is a specification.

This invention aims to provide an improved cap for tire valves, stay bolts, or the like, which serves not only to cover the valve and protect it from dust, but to hold the same firmly and to be locked so that it shall not be unscrewed by the jarring to which it is subjected in use.

Various features of improvement are referred to in detail hereinafter.

The accompanying drawings illustrate embodiments of the invention.

Figure 1 is a sectional view of the cap in position upon a valve; Fig. 2 is a similar view of a cap applied to a stay bolt; Fig. 3 is a sectional view showing the several parts of the cap separated from each other; Fig. 4 is a plan of the washer of a valve cap; Fig. 5 is a plan of the washer of a stay bolt cap; Fig. 6 is a plan of the spring; Fig. 7 is an elevation of the complete cap.

The tire and rim are shown in longitudinal section in Fig. 1 and in cross-section in Fig. 2.

The valve, stay bolt or the like, is externally threaded, engages the tire and projects a considerable distance through the rim, and the cap incloses substantially the whole of the projecting portion of the threaded member. The cap comprises a tube closed at its upper end and screwthreaded near its inner end, being of a sufficient diameter beyond the screwthreads to accommodate freely the projecting portion of the screwthreaded member; a washer, and a spring adapted to impositively hold the tube from rotation relatively to the washer. The washer is held against rotation either by having a non-circular aperture fitting upon a non-circular threaded member, or by friction against the rim of the wheel. Thus the cap is held against rotation when subjected only to the accidental and comparatively slight strains occurring in use, but is capable of being unscrewed by a wrench.

Referring to the particular embodiments illustrated, A in Fig. 1 is a tire valve which at its inner end is clamped to the tire B, and is held from rotation by means of the usual non-circular washer C of metal, or in any other usual or suitable manner. The tube D is closed at its outer end and screwthreaded near its inner end to engage the threads formed upon the outside of the valve A. The portion E of the tube which is beyond the threaded portion, has an enlarged internal diameter which accommodates the outer portion of the valve. By threading only the portion near the lower end of the tube D, an economy in manufacture is effected. Wrench faces F are formed preferably upon the lower portion of the tube to permit screwing and unscrewing the same easily.

A washer G is provided between the lower end of the tube D and the rim H, and is provided with a number of depressions J. The tube D has a portion K of its lower face also provided with depressions J. Between the washer G and the face K of the tube is a ring L of spring metal having projections M and N extending upward and downward respectively from the plane of the ring and in position to engage the depressions J of the washer and tube. Now when the tube is screwed down upon the valve it comes into contact with the spring L, and as it is screwed farther the opposite depressions J are engaged by the projections M and N of the spring, and the tube and washer are held against rotation relatively to each other. The projections M and N however, or at least one of them, are V-shaped, so that if it is desired to unscrew the tube, a sufficient pressure may be applied to force one or other of the projections M, N out of the depression in which it lies.

The entire device is very conveniently arranged by uniting the tube, washer and spring, so that when the tube is removed the washer and spring are removed with it, and cannot be lost, and so that in applying the cap there is practically only one piece to be applied to the projecting screwthreaded member. For conveniently connecting the parts to each other, the washer G is cup-shaped, having a rim O projecting upward and surrounding a flange P on the lower edge of the cap, the rim O being provided with a flange Q which is bent over the flange P of the tube with sufficient play to permit the tube to escape engagement with the spring. The flange Q is made of thinner metal than the rim O, so that it may be easily and accurately bent inward over the flange P by spinning, swaging or otherwise, the lower edge of the flange Q marking the limit of upward movement of the flange P. The parts are very cheaply connected together, but with perfect security, and in the most convenient arrangement for application to a valve.

In order to prevent the entire cap, including the tube and the washer, from turning relatively to the valve, the latter is made noncircular, as for example by providing two flat faces R on its outer periphery, and forming a hole in the washer G with flat edges S fitting the flat faces R of the valve and preventing rotation of the washer relatively to the valve.

In the case of the stay bolt T (Fig. 2) the construction of the cap is the same in all important respects. The proportions are somewhat different. In this connection I have illustrated a washer G which is not held against rotation by its shape, but merely by its friction against the rim H.

A convenient feature of construction is the provision at the lower end of the tube D of an enlarged tubular portion or ring U which fits around the spring L closely, so as to hold the latter perfectly centered, which facilitates the assembling of the parts.

Both the stay bolt and the valve constitute means for clamping the tire on the rim, the plate C of the valve lying between the inner edges of the shoe in a similar manner to the wedge block of the stay bolt.

Though I have described with great particularity of detail certain specific embodiments of my invention, yet it is not to be understood therefrom that the invention is limited to the particular embodiments disclosed. Various modifications in detail and in the arrangement and combination of the parts may be made by those skilled in the art, without departure from the invention.

What I claim is:—

1. Means for clamping a pneumatic tire upon a wheel rim including in combination an externally threaded member engaged with the tire and projecting a considerable distance through the rim, and a cap designed to inclose substantially the whole of the projecting portion of said threaded member and comprising a tube closed at its outer end, screwthreaded near its inner end to screw upon said member, and of a sufficient diameter beyond the screwthreaded portion to accommodate the projecting portion of said member, a washer directly engaging said tube, and a spring between said washer and said tube, said spring being adapted to engage one of said parts and the other of said parts having depressions, and said spring having a projection engaging said depressions and holding said washer and tube in a fixed position relatively to each other under comparatively slight strains but yielding under comparatively great strains.

2. Means for clamping a pneumatic tire upon a wheel rim including in combination an externally threaded member engaged with the tire and projecting a considerable distance through the rim, and a cap designed to inclose substantially the whole of the projecting portion of said threaded member and comprising a tube closed at its outer end, screwthreaded near its inner end to screw upon said member, and of a sufficient diameter beyond the screwthreaded portion to accommodate the projecting portion of said member, a washer directly engaging said tube, and a spring between said washer and said tube, the adjacent faces of the tube and the washer having depressions and said spring having projections engaging said depressions and holding said washer and tube in a fixed position relatively to each other under comparatively slight strains, but yielding under comparatively great strains.

3. Means for clamping a pneumatic tire upon a wheel rim including in combination an externally threaded member engaged with the tire and projecting a considerable distance through the rim, and a cap designed to inclose substantially the whole of the projecting portion of said threaded member and comprising a tube closed at its outer end, screwthreaded near its inner end to screw upon said member and of an enlarged diameter beyond the screwthreaded portion, a washer secured loosely to said tube, and a spring adapted to impositively hold said tube and said washer from rotation relatively to each other.

4. Means for clamping a pneumatic tire upon a wheel rim including in combination an externally threaded member engaged with the tire and projecting a considerable distance through the rim, and a cap designed to inclose substantially the whole of the projecting portion of said threaded member and comprising a tube closed at its outer end, screwthreaded near its inner end to screw upon said member and of an enlarged diameter beyond the screwthreaded portion, a washer secured loosely to said tube, and a spring adapted to impositively hold said tube and said washer from rotation relatively to each other, said washer being also held against rotation relatively to said member.

5. Means for clamping a pneumatic tire upon a wheel rim including in combination an externally threaded member engaged with the tire and projecting a considerable distance through the rim, and a cap designed to inclose substantially the whole of the projecting portion of said threaded member and comprising a tube D closed at its outer end, screwthreaded near its inner end to screw upon said member and of a sufficient diameter beyond the screwthreaded portion to accommodate the projecting portion of said member, a washer G, and a spring adapted to impositively hold said tube and said washer from rotation relatively to each other, said tube having a flange P at its inner end, and said washer having a rim O with a flange Q extending inward over said flange P and holding said cap and washer loosely together.

6. Means for clamping a pneumatic tire upon a wheel rim including in combination an externally threaded valve A having a flat face R, a washer G having an opening with a corresponding flat edge S so as to fit said valve without rotation, a tube closed at its outer end, screwthreaded near its inner end to screw upon said valve and of sufficient diameter beyond the screwthreaded portion to accommodate the projecting portion of said valve, said tube directly engaging said washer, and a spring adapted to impositively hold said tube and said washer from rotation relatively to each other.

7. Means for clamping a pneumatic tire upon a wheel rim including in combination an externally threaded member engaged with the tire and projecting a considerable distance through the rim, and a cap designed to inclose substantially the whole of the projecting portion of said threaded member and comprising a tube D closed at its outer end, screwthreaded near its inner end to screw upon said member and of an enlarged diameter beyond the screwthreaded portion, a washer G, the adjacent faces of the tube and the washer having depressions J, and a spring between said washer and said tube having projections M and N engaging said depressions and holding said washer and tube in a fixed position relatively to each other under comparatively slight strains, but yielding under comparatively great strains, said tube being provided with a ring U surrounding and inclosing said spring L.

8. A cap for stay bolts or the like, comprising a tubular member having a screwthreaded portion at one end, a washer swiveled to said tubular portion, and means engaging said tubular portion and said washer for resisting relative rotation thereof.

9. A cap for stay bolts or the like, comprising a tubular member having a screwthreaded portion at one end, a washer swiveled to said tubular portion, and a spring between said tubular portion and said washer for resisting relative rotation thereof.

10. A cap for stay bolts or the like, comprising a tubular member having a screwthreaded portion at one end, a washer swiveled to said tubular portion, said tubular portion bearing directly against said washer, and means between said tubular portion and said washer for resisting relative rotation thereof.

11. In a clamping device or the like, the combination of a threaded portion and a washer portion, the threaded portion bearing directly against said washer portion, and a spring between said parts for resisting relative rotation thereof.

12. In a clamping device or the like, the combination of a threaded portion and a washer portion, the threaded portion bearing directly against said washer portion, and a spring engaging both said parts for resisting relative rotation thereof.

13. A cap for stay bolts or the like, comprising a screw-threaded part, a washer swiveled to said screw-threaded part, said washer having a hole therein with a flattened face adapted to engage the flat face of a bolt, and means engaging said threaded portion and said washer for resisting relative rotation thereof.

14. A cap for stay bolts or the like, comprising a screw-threaded part, a washer swiveled to said screw-threaded part, said washer having a hole therein with a flattened face adapted to engage the flat face of a bolt, said threaded part bearing directly against the said washer, and means engaging said threaded portion and said washer for resisting relative rotation thereof.

In witness whereof, I have hereunto signed my name in the presence of two subscribing witnesses.

HARRY K. RAYMOND.

Witnesses:
VICTOR ALLEN PARKER,
GEORGE A. SCANLON.